United States Patent [19]

Sumption et al.

[11] 3,979,835

[45] Sept. 14, 1976

[54] METHOD AND APPARATUS FOR MEASURING CARCASSES

[75] Inventors: Richard F. Sumption, Portsmouth; Charles H. Wallace, Carrollton, both of Va.

[73] Assignee: International Telephone and Telegraph Corporation, Nutley, N.J.

[22] Filed: Aug. 15, 1975

[21] Appl. No.: 604,972

Related U.S. Application Data

[60] Division of Ser. No. 551,879, Feb. 21, 1975, which is a continuation of Ser. No. 455,168, March 27, 1974, abandoned.

[52] U.S. Cl. ............................ 33/169 B; 33/172 E
[51] Int. Cl.² ........................ G01B 5/18; G01B 7/26
[58] Field of Search ............ 33/169 B, 169 F, 172 E, 33/174 D

[56] References Cited
UNITED STATES PATENTS

| | | |
|---|---|---|
| 2,763,935 | 9/1956 | Whaley et al. .................. 33/169 B |
| 3,271,564 | 9/1966 | Rosenfeld et al. .................. 33/138 |
| 3,478,435 | 11/1969 | Cook .................. 33/169 B |

*Primary Examiner*—Richard E. Aegerter
*Assistant Examiner*—Richard R. Stearns
*Attorney, Agent, or Firm*—John T. O'Halloran; Thomas M. Marshall

[57] ABSTRACT

According to the disclosure, a tool is provided for measuring the thickness of fat in a carcass and producing a signal representative of the measured thickness, and means is coupled to said tool for receiving and storing a value representing a measured thickness. The method includes inserting the measuring tool into the fat of a carcass to produce a signal representative of the fat thickness, continuously receiving said signal corresponding to the measured thickness, indicating on said tool when the fat thickness has been measured, and storing in response to said indication the signal corresponding to the measured thickness.

5 Claims, 6 Drawing Figures

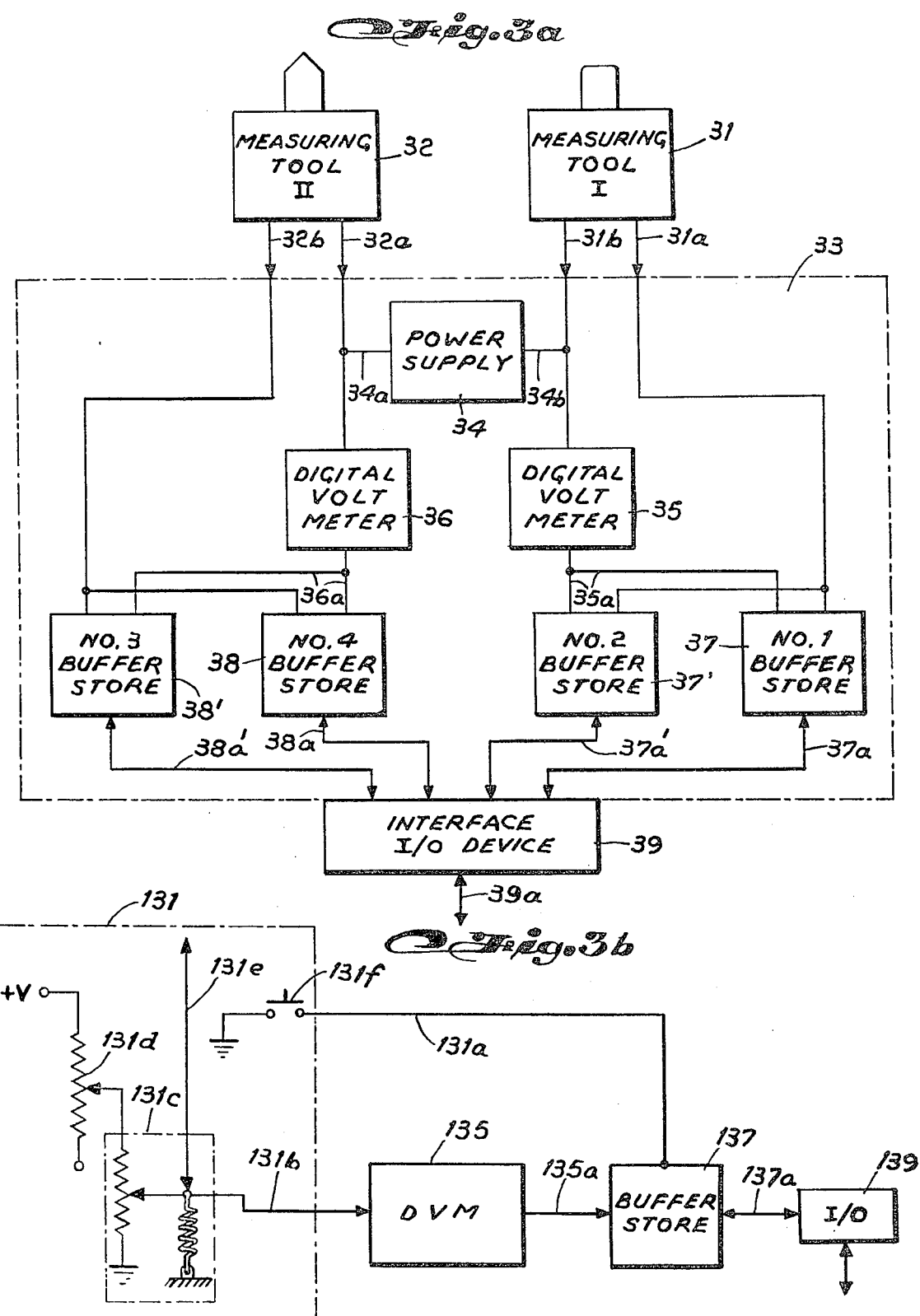

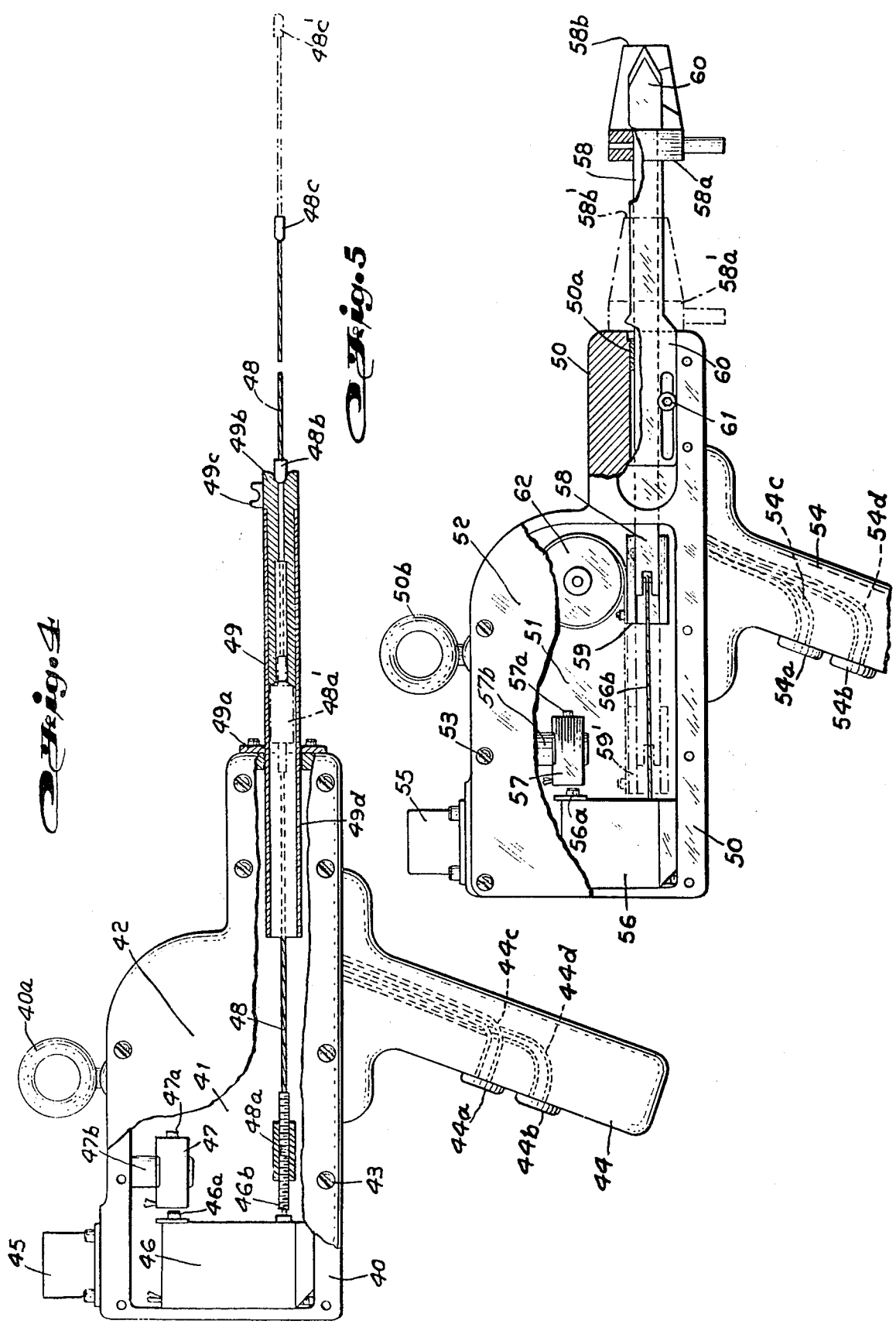

METHOD AND APPARATUS FOR MEASURING CARCASSES

This is a division, of application Ser. No. 551,879, filed Feb. 21, 1975 which was a continuation of application Ser. No. 455,168, filed Mar. 27, 1974 now abandoned.

BACKGROUND OF THE INVENTION

As is the case for most meats, port grading also involves the principle of identification of economically important differences in quality and quantity.

In general, the standards provide two levels of quality: one for carcasses with acceptable lean quality and the other for carcasses with unacceptable lean quality. The quality of the lean can be evaluated by observing the cut surface of a major muscle, and when such a surface is available it can be used as the basis for the quality evaluation. The quality-indicating characteristics include such features as marbling, firmness and color. The degree of external fatness, as such, is not considered in evaluating lean quality.

In evaluating quality on a lean cut surface, some standards describe the characteristics of the loin-eye muscle at the 10th rib. However, when this surface is not available, other exposed major muscle surfaces, such as the ends of the loin, are used. Such evaluations are based on the normal development of the quality-indicating characteristics in relation to their development in the loin-eye muscle at the 10th rib.

When a major muscle cut surface is not available, the quality of the lean is evaluated indirectly, based on quality-indicating characteristics that are evident in carcasses. These include firmness of the fat and lean, amount of feathering between the ribs, and color of the lean.

Carcasses which have unacceptable lean quality or bellies too thin to be suitable for bacon production are normally graded U.S. Utility. Soft and oily carcasses are also normally graded U.S. Utility regardless of their development of other quality-indicating characteristics.

Carcasses with acceptable lean quality and acceptable belly thickness are graded U.S. No. 1, U.S. No. 2, U.S. No. 3, or U.S. No. 4. These grades are based almost entirely on the expected carcass yields of the four lean cuts, i.e. ham, loin, picinic shoulder, and Boston butt. The expected yields of the four lean cuts for each of these four grades have been tabulated as follows:

| Expected Yields of the Four Lean Cuts Based on Chilled Carcass Weight | |
|---|---|
| Grade | Yield |
| U.S. No. 1 | 53 percent and over |
| U.S. No. 2 | 50 to 52.9 percent |
| U.S. No. 3 | 47 to 49.9 percent |
| U.S. No. 4 | Less than 47 percent |

It can be expected that these yields will be approximately 1 percent lower if based on hot carcass weight.

These yields are based on the normal cutting and trimming methods used by the USDA in developing the standards. In general, this involves closer trimming of the fat than is usual in commercial practice. Different yields may result from other methods of cutting or trimming. However, if these methods are applied uniformly, differences in yields between the grades will remain relatively comparable.

Carcasses differ in their yields of the four lean cuts because of differences in their degrees of fatness and in their degrees of muscling - thickness of muscling in relation to skeletal size. Since the average thickness of backfat in relation to either carcass weight or length has been found to be a good indicator of the yield of the four lean cuts, these factors, together with a muscling evaluation, are used as the basis for the numbered grades.

Referring now to FIG. 1, there is shown where some of the standard measurements for average backfat thickness and carcass length are made. The average backfat thickness can be made perpendicular to the outside surface of the carcass opposite the first and last ribs and the last lumber vertebrae. Carcass length is generally measured from the anterior point of the aitch bone to the anterior edge of the first rib next to the backbone. Hot carcass weight is based on an entire carcass dressed packer-style—split into two sides down the back, jowles attached, and head, ham facings and leaf fat removed.

In some carcasses the actual average thickness of backfat is not representative of their degree of fatness. In such cases, the standards provide that an appropriate adjustment shall be made in the average thickness of backfat. In determining whether or not an adjustment is necessary, particular measurements are made in the backfat thickness at points other than those used in determining the average and the amount of fat in such areas as over the outside of the hams, directly anterior to the hip bone, over the edge of the loin, and at the juncture of the belly with the shoulder. For a carcass having a fat distribution indicative of a greater degree of overall fatness than that associated with its actual average thickness of backfat, the average thickness of backfat is then adjusted upward or downward as required and indicated by the measurements.

FIG. 2 illustrates the general relationships between average thickness of backfat, carcass length or weight, and grade for carcasses with muscling typical of their degrees of fatness. Within each grade, as carcass length or weight increases, average backfat thickness also increases. The rate of increase is typically one-tenth of an inch in average backfat thickness for a 3-inch increase in carcass length or about a 45-pound increase in carcass weight. For example, at a carcass length of 30 inches or a carcass weight of 165 pounds, the thickness of backfat at the juncture of the No. 1 and No. 2 grades is 1.4 inches. At the juncture of the No. 2 and No. 3 grades it is 1.7 inches and it is 2.0 inches at the juncture of the No. 3 and No. 4 grades. Also, as shown in FIG. 2, "thick" is the normal degree of muscling specified for carcasses at the juncture of the No. 1 and No. 2 grades; "moderately thick" muscling is specified for carcasses at the juncture of the No. 2 and No. 3 grades; and "slightly thin" muscling is considered normal for carcasses at the juncture of the No. 3 and No. 4 grades.

In view of the numerous measurements presently required and contemplated in the future to accurately determine the proper classification of carcasses, a means and method for making accurate and repetitive measurements on a carcass during processing is required. Bearing in mind that if one desires to grade and measure each hog during processing on a given day in a packing plant which can normally handle 4000 to 5000 carcasses per day, numerous measurements must be made and a means for accomplishing the measurements and recording the results in rapid order to properly classify individual carcasses and groups of carcasses.

SUMMARY OF THE INVENTION

Accordingly, an improved means and method is provided for measuring carcasses in a continuous manner.

Another object of the invention is to be able to rapidly measure and record the results of the measurement in a continuous manner.

A particular object is to provide an improved means and method of measuring hog carcasses which is useful in grading the carcasses.

According to aspects of the invention, there is provided means for measuring the thickness of fat in the carcass and providing another signal representative of the measured thickness, and means are coupled to the additional measuring tool for receiving the other signal and for storing the signal at a predetermined time.

Additionally, the method of the invention further comtemplates inserting a measuring tool into the fat of a carcass to produce a signal representative of the fat thickness, continuously receiving and converting the signal, indicating in said tool when the thickness measurement has been made, and storing in response to the indication the signal corresponding to the measured length.

The measurements may then be utilized accoring to the invention for evaluating the carcasses, individually or in groups.

The invention also provides a measuring tool for insertion into a body and producing a signal proportionate to the insertion, including a handheld tool body having a mounting cavity, an insertion means mounted to said body, a transducer mounted in said cavity and having pre-biased output cable, spring means mounted in said cavity and coupled by means connecting said spring means and output cable such that said spring means retains said output cable in a first position, slide means slideably mounted on said insertion means and coupled to said coupling means, and means on said tool positioned for being activated, whereby said transducer provides a signal proportional to the depth of insertion into a body by said insertion means and to amount of displacement of said slide means for its normal first position to its displaced position.

BRIEF DESCRIPTION OF THE DRAWINGS

The invention in both its apparatus and method will best be understood if reference is made to the following Figures in conjunction with the Description of the Preferred Embodiments, in which:

FIG. 3a is a block diagram illustrating apparatus for measuring and recording according to the invention;

FIG. 3b is a partial schematic drawing illustrating certain features and portions of the invention useful in understanding the operation and method of use of the apparatus described in connection with FIGS. 4 and 5;

FIG. 4 is a plan view of a measuring tool according to the invention useful in measuring lengths and circumferences of carcasses; and FIG. 5 is a plan view of a measuring tool useful in measuring fat thickness in a carcass.

DESCRIPTION OF THE PREFERRED EMBODIMENTS

Figure 2:
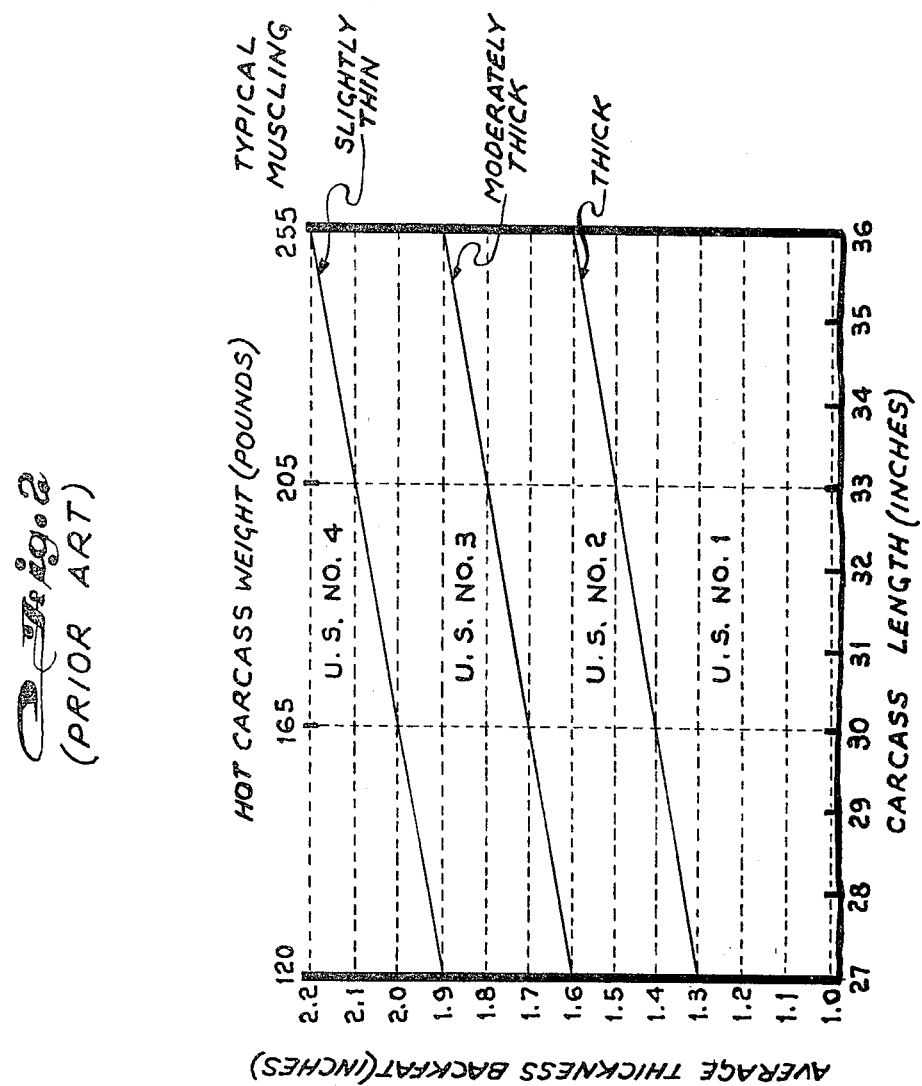
FIG. 2 is a chart illustrating according to the prior art the relationships between thickness of backfat, carcass length or weight and grade for carcasses with muscling typical of their degree of fatness.

As indicated in the Background of the Invention, a method and means are required in order to properly classify each hog being processed by a packer, since the economic importance in such classification is quite substantial. In evaluating and properly classifying the carcasses of FIG. 1 so as to determine the classification according to the accepted standards illustrated in FIG. 2, it is important that as a minimum the carcass length measurement be made and the backfat thickness be measured in one or two places. Should other evaluation procedures be used, circumferential measurements about the ham portion, for example, may also be made utilizing the teachings of the disclosure.

In normal processing in a packer plant the carcasses, including whole carcasses and/or carcass halves, are moved on a conveyor arrangement by the hind legs in a continuous manner and at an approximate rate of about 400 to 500 an hour. Therefore, in order to make a measurement on each carcass or even every other carcass, it is necessary to have a means for rapidly making the measurements of length, circumference, and backfat thickness and recording there measurements in an accurate and substantially automatic manner.

Referring now to FIG. 3a, the arrangement and method for accomplishing the measuring and recording is shown in block form. The measuring tools 31 and 32 are coupled by leads to a data terminal generally indicated by dashed lines 33. The data terminal 33 includes at least a power supply 34, digital volt meters 35, 36, respectively coupled to storage buffers 37, 37', 38, 38' and to an interface input-output device 39. The input-output device 39 can then be coupled by 39a to a central data store or other central computer processing apparatus. The central apparatus may store all the data and/or further process the data according to the method of organizing the data for grading of the carcasses. Although the leads are shown as single lines, it should be understood that they represent multiple leads and are shown as single leads only for purposes of the drawing representation.

Leads 31a from measuring tool 31 are coupled to control buffers 37, 37' and the output from the buffers is coupled by leads 37a, 37a' to the input of device 39. Measuring tool 31 is also coupled by leads 31b to the input of digital volt meter 35, and the output of digital volt meter 35 is coupled by leads 35a to other inputs of buffers 37, 37'.

In a similar manner, measuring tool 32 is coupled by leads 32a to digital volt meter 36 and the output of digital volt meter 36 is coupled by leads 36a to other inputs of buffer stores 38, 38'. The output of the buffers 38, 38' is coupled by leads 38a, 38a' to device 39. The output leads 32b of measuring tool 32 are coupled to control the buffer stores 38, 38'. The power supply 34 is coupled by leads 34a and 34b to the measuring tools, digital volt meters, and buffers to supply the necessary voltage requirements of the terminal 33.

Referring now to FIG. 3b, a schematic drawing useful in understanding the method and apparatus of the invention is provided, wherein the principal features of a measuring tool are included within the dashed lines indicated at 131. The digital volt meter 135 is coupled to buffer store 137 which may be in the form of a sample and hold circuit by lead 135a and its output coupled by leads 137a to the input-output device 139. This circuit configuration will enable an analog signal on lead 131b of the measuring tool 131 to be coupled to digital volt meter 135 which converts the analog input voltage to a digital voltage in the form of a binary coded decimal output 135a which is continuously coupled to buffer 137 which stores the signal for subsequent delivery by device 139 to the central processing arrangement.

The measuring tool 131 includes within its configuration a transducer element comprising a spring biased potentiometer, symbolically represented within dashed lines 131c, a trimmer potentiometer 131d, a push or pull element 131e, and a switching or indicating means 131f and a lead 131a coupled to another input of buffer 137.

According to the practice of the invention, the trimpot 131d is coupled at one terminal to a source of potential +V and its tapping point terminal to one end of a variable potentiometer of transducer element 131c. The other end of the variable potentiometer may be grounded. The tapping point of the potentiometer is spring biased to a normal set position. Attached to the tapping point is a push or pull element which is manually extendable or retractable to change the analog voltage appearing on lead 131b. This voltage is continuously coupled to the digital volt meter which converts the analog signal to a digital BCD signal which is continually fed to the buffer store. The buffer store continuously samples the output 135a which changes continuously as the element 131e is moved from the normal biased position set in the transducer. The sampled signal is then held in the buffer by activating switch or indicator means 131f which may be a microswitch having one terminal at ground or other potential placed on the inhibit or store input of buffer 137.

The measuring tool 131 has established by virtue of the voltage reference +V an analog signal value representing a predetermined measurement and by extending or retracting the element 131c, the analog voltage level is altered. This provides an analog signal representative of a measured length which may be related to the length or circumference of a carcass or to the fat thickness measured. At the moment the measurement is made, switch 131f is activated on the tool and the digital representation of the analog signal in a coded form is stored. Subsequently, the stored read-out by the in-out device is coupled into a central store or processing arrangement to be utilized in grading. It should also be evident that each tool may include more than one microswitch and as shown in FIG. 3a, would cause a second measurement to be stored. For example, the first digital volt meter 35 output would be stored in the No. 1 buffer store by activating a first switch, and activating the second microswitch would cause the storage in the No. 2 buffer store. In a similar manner, the measuring tool 32 by activating first and second microswitches would cause the storage of the output of digital volt meter 36 to be sequentially made in buffer No. 3 and buffer No. 4.

In the manner in which FIG. 3a is arranged, it is contemplated that the carcasses traveling on a conveyor will pass position I and measuring tool 31 will be utilized as described in connection with FIGS. 3a and 3b, and to be subsequently described in connection with FIG. 4. The carcasses then continue to position II to measuring tool 32 wherein the desired fatback or insertion measurements are made utilizing this tool and as more specifically described in connection with FIG. 5.

This invention incorporates apparatus and methods of measuring using handheld devices which are connected by leads to a terminal device which may or may not be remotely located from the hand measuring tools. The instantaneous measurements made by the tools comprise analog signals which are correlated to the measurements made on the carcasses and they are converted in the terminal device to coded digital signals representing the measurement and the digital signal are stored when indicated by an activating switch on the handheld measuring tool. These stored signals are then transferred to a larger central processing or storage arrangement for utilization in classifying and grading the carcasses. The method includes producing in a first measuring tool an analog signal representing a length or circumference measurement, continuously receiving and converting the analog signal to a digital signal corresponding to the length or circumferential measurement, indicating when the measurement is completed, and storing the digital signal corresponding to the measured length in response to the indication produced. The method further includes the steps of inserting a second measuring tool into the fat of the carcasses to produce an analog signal representative of the fat thickness, continuously receiving and converting this analog signal into a digital signal corresponding to the measured fat thickness, indicating on the second tool when the fat thickness has been measured and storing in response to the indication the digital signal corresponding to the measured thickness. The measurements are then utilized to grade the carcasses.

Referring now to FIG. 4, there is shown a handheld measuring tool in a plan view which is used for providing the length and any circumference measurements on the carcasses. The tool has a general pistol shape comprising a main body portion 40 having a cavity 41, a cover 42 attached by means 43 to enclose the contents contained within the cavity 41 of the body. A handle grip 44 has mounted thereon and positioned for activation switch or signalling elements 44a and 44b with their leads 44c and 44d being coupled through the body and out a terminal connector 45 to the data terminal 33. Fixedly mounted within the cavity 41 of the body 42 is the transducer element 46 with an adjustment means 46a. Also mounted within the cavity is a trimmer potentiometer 47 with adjustment means 47a mounted by racket means 47b within the cavity. The transducer output extension 46b is coupled to an extension means in cable 48 by coupling means 48a. The cable extension 48 which extends through a nozzle 49 is mounted by means 49a to the body 40 of the tool. Nozzle 49 includes an end portion 49b and a retaining means 49c. The cable extension 48 includes two spacer terminal means 48b and 48c. The coupling means 48a' is shown in an extended position in dashed lines and the extension of cable spacer terminal 48c' is shown in dashed lines. Nozzle portion 49d provides a guide means for the coupling and cable during extension and retraction. Means 48b indicates the return limit on the set normal position of the cable 48 which is the normal set position of the transducer element 46. Transducer 46 has its output leads coupled to the connector 45 in a known manner. The transducer 46 may be of the type identified as Displaceable Transducer-Model 4046 and marketed by R. I. Controls, Minneapolis, Minn. This element provides the analog signal as indicated in FIG. 3b, numbered as 131c.

Figure 1:
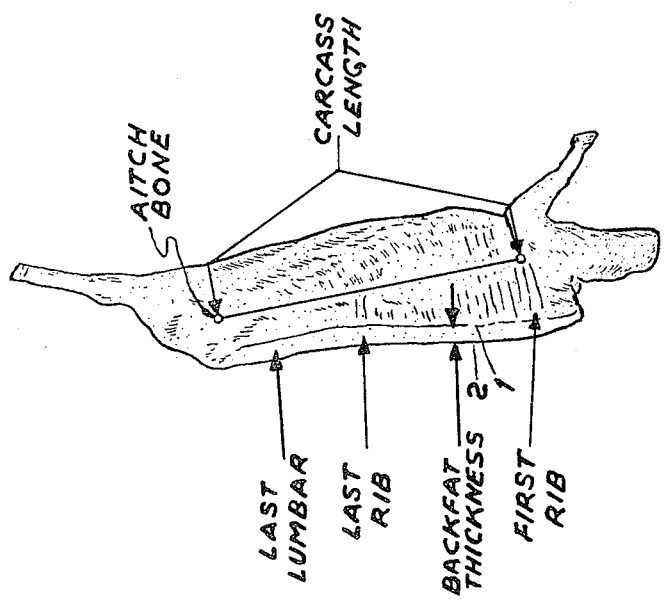
FIG. 1 illustrates a typical half carcass and indicates some standard measurements and features according to the prior art.

Use of the measuring tool for linear measurement is as follows. The tool is held in one hand by handle 44 with the thumb of the hand positioned to activate the microswitches 44a, b. The terminal means 48c is placed on the aitch bone of the carcasses and the tool is pulled downward to the first rib which extends the cable 48 until the front-most nozzle portion 49b touches the first rib portion to make the cable extend the carcass length as indicated in FIG. 1. At this point, the thumb presses one of the switches 44a, b to indicate to the terminal means 33 that the measurement has been made and the signal representing this length measurement should be stored.

In order to make a circumference measurement about a portion of the body of the carcasses, the spacer element 48c is pulled out and about the circumference of the body and placed within the retaining means 49c and the switch activated to make the circumference measurement. Since as indicated in FIG. 2 the carcass length normally ranges within 10 inches, it has been found than an 8 inch displaceable potentiometer is satisfactory with a 27 inch cable extension from 48b to 48c.

The trim potentiometer 47 is utilized to finely adjust the analog control signal to account for variations in the setting and elements comprising the apparatus so that an accurate analog voltage to linear measurement correlation can be made. The handheld measuring tool may also include a hanging ring 40a fixedly attached to the body 40 of the tool. The tool may be hung retained in a predetermined position with sufficient slack for reasonable movement by the operator.

Referring now to FIG. 5, a handheld tool is illustrated for measuring the backfat thickness by insertion of the tool point into surface 1, FIG. 1, up to the skin surface 2 without penetration of the skin. This tool also has a general pistol shape comprising a body 50 with a cavity 51 and cover 52 enclosing the contents mounted within the cavity by means 53. A hand grip 54 has switch or signalling elements 54a, 54b with their connecting leads 54c, d mounted thereon. The leads are coupled to connector 55 through the body 50 of the tool. Fixedly mounted within the cavity 51 is a transducer 56 with adjustment 56a, a trimmer potentiometer 57 with adjustment 57a mounted by bracket 57b. Slide means 58 is connected to the extendable and retractable transducer cable 56b. Mounted within the cavity is a spring means 62 which may be a negator-type spring which is coupled by coupling means 59 to the slide means 58. Fixedly mounted to the body 50 is a fat penetration knife 60, fixed by means 61. The knife point is sufficiently sharp to pierce the fat at surface 1, FIG. 1, but not pierce the skin through surface 2. The slidable element 58 slides within bearing means 50a and has a hand-adjustable portion 58a which is movable from the position shown to the dotted position indicated by 58a'. In a similar manner, the coupling means 59 is movable and causes the retraction of the cable element 56b to the position shown in dashed lines and is indicated by 59'. This tool may also be hung by means 50b mounted to the body 50 so that the tool may be retained in a position two and according to the arrangement of FIG. 3a.

This type of measuring tool for measuring backfat thickness is utilized as follows. The tool is gripped by the handle 54 in one hand and the slide means 58a is gripped with the other hand and slid from the shown position to the position 58a' shown in dashed lines. The point of knife 60 of the tool is then inserted into the carcass backfat but does not puncture the skin of the carcasses. When the skin stops the penetration, slide element 58a is released, and the spring 60 returns the slide element 58a to an intermediate position between solid dashed lines, so that the surface 58b' rests against the fat surface. This displacement represents a difference between the knife point and the thickness of the fat. At this time, the switch or signalling element 54a, b is activated by the thumb holding the tool by the handle. A second measurement may be made at another point in the fat thickness, so that the two measurements may be averaged by repeating the process of retracting the slide member, inserting the knife, releasing the slide, and pressing the other switch element to indicate that the measurement is complete and the signal representing the measurement is to be stored. The transducer element 56, in view of the smaller range of variation of backfat thickness as illustrated in FIG. 2, need not be as large, although the same type may be used having approximately a three and one-half inch cable to accomplish the measurement utilizing the principles of the invention.

In the foregoing description, we have described apparatus and methods of continually measuring and recording these measurements to serve as a particular basis for grading individual or groups of hog carcasses or carcass halves. In addition, we have disclosed handheld measuring tools to automatically and continuously provide length, circumference and thickness measurements on animal carcasses in general so that the measurements may be recorded, and then fed to a central device for utilization. Those skilled in the art will no doubt realize the potential application in other than animal carcass measurements.

While we have described above the principles of our invention in connection with specific methods and apparatus, it is to be clearly understood that this description is made only by way of example and not as a limitation to the scope of our invention as set forth in the objects thereof and in the accompanying claims.

We claim:

1. A measuring tool for insertion into a body and producing a signal proportionate to the depth of insertion, comprising:

a tool body having a cavity therein;
longitudinally extending insertion means mounted to said body;
a hand grip mounted to said body;
a transducer mounted in said cavity and having an extendable and retractable output cable;
spring means mounted in said cavity;
coupling means connected to said spring means and to said output cable, such that said spring means retains said output cable in a first extended position;
slide means longitudinally and slidably mounted on said insertion means and extending to said body and coupled to said coupling means; and
means on said tool positioned for being manually activated to indicate when said transducer signal is representative of the depth of insertion into said body by said insertion means, and said means is desirably activated when the said slide means is moved from the first extended position to a displaced positon corresponding to the depth of insertion.

2. The tool of claim 1 wherein said hand grip has mounted thereon said activating means, whereby the hand holding the tool by the handle may activate said means.

3. The tool of claim 1 wherein said tool includes a trimming potentiometer mounted in said cavity and electrically coupled to said transducer for adjusting the signal output of said transducer.

4. The tool of claim 1 including a connector means mounted on said tool body for coupling a supply voltage to said transducer.

5. The tool of claim 1 including a mounting ring fixedly attached to the tool body to enable hanging of the tool in a predetermined position.

* * * * *